(12) United States Patent
Yule

(10) Patent No.: US 6,809,775 B2
(45) Date of Patent: Oct. 26, 2004

(54) TV RECEIVER APPARATUS AND RELATED METHOD

(75) Inventor: Andrew T. Yule, Felbridge (GB)

(73) Assignee: Koninklijke Philips Electronics N.V., Eindhoven (NL)

(*) Notice: Subject to any disclaimer, the term of this patent is extended or adjusted under 35 U.S.C. 154(b) by 407 days.

(21) Appl. No.: 09/732,196

(22) Filed: Dec. 7, 2000

(65) Prior Publication Data

US 2001/0015772 A1 Aug. 23, 2001

(30) Foreign Application Priority Data

Dec. 11, 1999 (GB) ............................................. 9929268

(51) Int. Cl.⁷ ................................................. H04N 5/44
(52) U.S. Cl. ..................................... 348/553; 348/725
(58) Field of Search ......................... 348/725, 10, 553; 455/3.02, 6.1; 342/357.06, 357.12, 357.08

(56) References Cited

U.S. PATENT DOCUMENTS

| | | | | |
|---|---|---|---|---|
| 5,621,793 A | | 4/1997 | Bednarek et al. | |
| 5,797,091 A | * | 8/1998 | Clise et al. | 455/404 |
| 5,818,389 A | * | 10/1998 | Lazar | 342/383 |
| 5,983,071 A | * | 11/1999 | Gagnon et al. | 348/10 |
| 6,108,365 A | * | 8/2000 | Rubin et al. | 375/130 |
| 6,252,544 B1 | * | 6/2001 | Hoffberg | 342/357.1 |

* cited by examiner

*Primary Examiner*—John Miller
*Assistant Examiner*—Trang U. Tran

(57) ABSTRACT

TV receiver apparatus (1) and a related method are disclosed, the TV receiver apparatus comprising a video signal receiver (2) for receiving video signals transmitted from an external video signal transmitter, a GPS signal receiver (3) for receiving GPS signals transmitted from an external GPS signal transmitter and signal coupling means (4) connected to both receivers. The signal coupling means is adapted to provide both receivers with respective video and GPS signals via a common antenna (5) where the antenna is adapted to receive terrestrially broadcasted video signals.

19 Claims, 1 Drawing Sheet

TV RECEIVER APPARATUS AND RELATED METHOD

BACKGROUND OF THE INVENTION

This invention relates to television (TV) receiver apparatus comprising a video signal receiver and a global positioning system (GPS) signal receiver and to a related method.

At present, GPS is most notably associated with the Navigation System with Time and Ranging (NAVSTAR) GPS, an all weather, spaced based navigation system developed and operated by the US Department of Defense, although the general principles underlying GPS are universal and not merely limited to NAVSTAR. Accordingly, GPS hereafter refers to any global positioning system comprising a plurality of CDMA radio transmitters at different locations and a receiver which determines its location based on the time of arrival of the transmissions of the radio transmitters.

The general principles underlying GPS and methods and apparatus for its implementation are known. For example, see GPS Principles and Applications (Editor, Kaplan) ISBN 0-89006-793-7 Artech House, hereinafter "Kaplan".

With respect to TV receiver apparatus, it is known from U.S. Pat. No. 5,621,793 (Bednarek et al.), to provide a TV set top box with a GPS receiver whereby GPS enables the location of the TV set top box to be determined. Bednarek discloses using knowledge of the location of the GPS receiver and hence TV set top box in order to provide TV access control and to deter theft. For example, TV access control may be effected by receiving location information from the GPS receiver and, only when the present location is consistent with an authorised location, decrypting an incoming video signal to enable its display.

Recent progress in the field of GPS dedicated integrated circuit design has enabled the signal processing portion of GPS receivers to be produced relatively cheaply. However, invariably, a GPS receiver (whether integrated with TV receiver apparatus or not) is provided with a dedicated GPS antenna. Such antennas are considered necessary due to the very low signal strength of a GPS signal relative to background noise and especially where a signal is received from a satellite positioned at a shallow angle above the horizon relative to the receiver.

In the context of satellite video transmission, Bednarek contemplates a combined antenna arrangement (lines 28 to 35 of column 9) wherein the antenna is a small satellite dish and receives both GPS and communications signals from a combined GPS / communications orbiting satellite. However, as noted at lines 30 to 31 of column 9 of Bednarek, a disadvantage of such an antenna arrangement is that satellites usually do not combine GPS and communication functions. Furthermore, given that a GPS receiver is typically required to receive and track signals from at least four non-geostationary satellites in order to determine its location, it is not clear from Bednarek how using a single satellite dish antenna would work since satellite dishes have a narrow field of view.

SUMMARY OF THE INVENTION

It is an object of the invention to provide cheaper TV receiver apparatus comprising a TV signal receiver and a GPS signal receiver.

According to the present invention, TV receiver apparatus is provided comprising a video signal receiver for receiving video signals transmitted from an external, terrestrially based video signal transmitter, a GPS signal receiver for receiving GPS signals transmitted from an external GPS signal transmitter and signal coupling means connected to both receivers and adapted to provide both receivers with respective video and GPS signals via a common antenna.

Use of a common antenna obviates the need for a dedicated GPS antenna. Additionally, many households already possess an antenna, often an external Yagi antenna, adapted to receive terrestrially broadcasted signals and may be therefore readily connected to TV receiver apparatus according to the present invention, thereby reducing installation costs.

The apparatus may include an antenna adapted to optimally receive terrestrially broadcasted video signals and, in particular, those broadcasted at UHF or VHF bands.

For convenience, the TV receiver apparatus and the coupling means may be contained in a common housing, for example a television set-top box or a television with an integral receiver.

Also provided is a method of receiving video and GPS signals in TV receiver apparatus comprising a video signal receiver and a GPS signal receiver both connected via signal coupling means to a common antenna, ideally adapted to optimally receive UHF or VHF video signals. The method comprising the steps of (a) receiving, via the antenna, video signals in the video signal receiver from an external, terrestrially based video signal transmitter; and (b) receiving, via the antenna, GPS signals in the GPS signal receiver from an external GPS signal transmitter.

BRIEF DESCRIPTION OF THE DRAWINGS

An embodiment of the invention will now be described, by way of example only, with reference to the accompanying figure in which.

DESCRIPTION OF THE PREFERRED EMBODIMENTS

Figure 1:
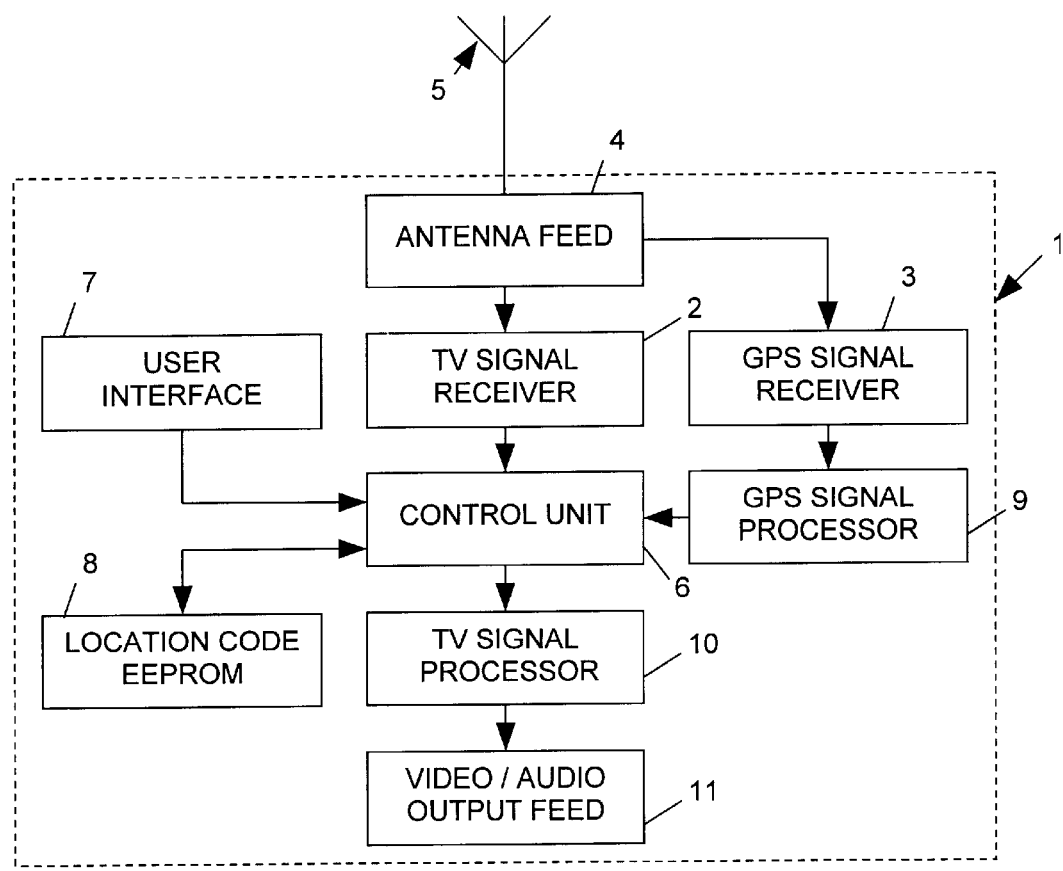
FIG. 1 shows a simplified block diagram representation of a TV set-top box comprising TV receiver apparatus according to the present invention.

In FIG. 1, a TV set-top box 1 is shown comprising a TV signal receiver 2 and NAVSTAR GPS L1 signal receiver 3 wherein both receivers receive respective TV and GPS signals via a common antenna feed 4 connected to a set top log-periodic antenna 5.

The TV signal receiver 2 includes tuning means which selects (under the control of signals from the control unit 6) a desired one of a plurality of terrestrially broadcast television channels and pre-processes the terrestrially broadcasted UHF video and corresponding audio signals and feeds them into a control unit 6.

In the GPS signal receiver 3, incoming GPS signals are filtered by a passive bandpass filter to reduce out of band RF interference, amplified and subsequently downconverted to an intermediate frequency (IF). The IF signal is then sampled and digitised by an analog to digital converter and outputted to the GPS signal processor 9. The L1 coarse acquisition (C/A) codes is acquired for in view satellites and, using conventional techniques, pseudo ranges are calculated from navigation data and resolved in order to determine the location of the set-top box 1. The determined location is fed to the control unit 6.

A user interface 7 is provided to enable the user, typically the owner, to enter a code identifying the desired location of operation of the set-top box 1. Entry of a location code is possible only after prior entry of a personal identification number (PIN), ideally known only to the owner. Upon correct entry of a PIN and a suitable location code, the location code is stored in the location code EEPROM 8 from which it can be accessed by the control unit 6.

The control unit 6 controls the operability of the TV set-top box in accordance with a predetermined operability scheme. If the location received from by the GPS signal processor 9 does not correspond to the location code accessible from the EEPROM 8, the control unit prevents the TV signal from being provided by the TV signal receiver to the TV signal processor 10. The TV set-top box is thus rendered inoperable. Conversely, if the location determined by the GPS signal processor corresponds to the location code accessible from the EEPROM, the control unit allows the TV signal to advance to the TV signal processor whereby it is suitably decoded and thereafter fed via a video/audio output feed 11 to an external television (not shown). Such access control may be used as a deterrent against theft and also to control access to certain television stations, for example, pay-per-view channels in which registration is based on the location of a given TV receiver.

In the example described, the operability of the TV set-top box is controlled between the TV signal receiver 2 and the TV signal processor 10. Of course, effective control of the operability of a set-top box or a TV may also be realized at other stages, for example, by disabling audio/video decoding or TV tube control, or by interrupting a power supply.

Whilst the GPS processor 9 for acquiring and tracking received GPS signals and the TV signal processor 10 for decoding the received TV signals are shown separately, they may be conveniently provided in the form of a single dual-purpose microprocessor. This provides additional security by virtue of making it more difficult to tamper with or by-pass the access control.

The NAVSTAR GPS L1 signal is right-hand circularly polarized (RHCP) and transmitted at 1,575.42 MHz. As such, it is conventional for a conical helix antenna or a variation thereof dedicated to GPS signal reception to be used. An antenna adapted to optimally receive terrestrially broadcasted video transmissions will have a relatively poor reception at GPS signal frequencies and tests indicate that at 1500 MHz, a set top log-periodic aerial is about 1% efficient. However, as a set-top box is generally stationary in use and the requirement to return a current location is not as immediate as say a navigation device, the inefficiency can be offset by an increased signal acquisition period. For example, in order to despread NAVSTAR GPS signals, correlation of the pseudorandom noise code of the incoming GPS signal with locally generated, replica pseudorandom noise codes may occur over a period of several seconds, e.g. 2, 5, 10, 20 or more, or even minutes, e.g. 1, 2 or more. Conventional NAVSTAR GPS receivers with dedicated antennas have short correlation periods of approximately 10 ms to 1 s in order to acquire the signal code as quickly as possible. A longer correlation period would provide a theoretical gain of between 20 and 40 dB. Of course, methods of acquisition of low strength spread signals are well known.

It will of course be appreciated that the invention may to applied to TV receiver apparatus other than in the form of a TV set-top box. For example, the invention may be implemented in a television housing an integral receiver, a video cassette recorder (VCR) or equivalent, or indeed any apparatus capable of receiving television signals.

Also, in addition to the anti-theft and access control applications described above, TV receiver apparatus according to the present invention may also be used to provide automatic customisation and configuration of both television receiver functions and television functions with respect to location. For example, automatic tuning in which the frequencies of stations received within a given vicinity are selected and programmed by location reference to a memory store of such frequencies; or by filtering information ancillary to audio and visual provided by TV signals, say prioritising the local weather reports as provided by teletext.

What is claimed is:

1. TV receiver apparatus comprising a video signal receiver for receiving video signals transmitted from an external, terrestrially based video signal transmitter, a GPS signal receiver for receiving GPS signals transmitted from an external GPS signal transmitter and signal coupling means connected to both receivers and adapted to provide both receivers with respective video and GPS signals via a common antenna.

2. Apparatus according to claim 1 wherein the TV receiver apparatus and the coupling means are contained in a common housing.

3. Apparatus according to claim 1 further comprising an antenna connected to the coupling means and adapted to optimally receive terrestrially broadcasted video signals.

4. Apparatus according to claim 3 wherein the antenna is adapted to optimally receive video signals broadcasted at UHF or VHF bands.

5. Apparatus according to claim 1 further comprising a GPS processor for acquiring and tracking received GPS signals and a TV signal processor for decoding the received TV signals, both provided in the form of a single dual-purpose microprocessor.

6. A method of receiving video and GPS signals in TV receiver apparatus comprising a video signal receiver and a GPS signal receiver both connected via signal coupling means to a common antenna, the method comprising the steps of:
   (a) receiving, via the antenna, video signals in the video signal receiver from an external, terrestrially based video signal transmitter; and
   (b) receiving, via the antenna, GPS signals in the GPS signal receiver from an external GPS signal transmitter.

7. A method according to claim 6 wherein the antenna is adapted to optimally receive UHF or VHF video signals.

8. The TV receiver apparatus of claim 3, wherein the antenna is a log-periodic antenna.

9. The TV receiver apparatus of claim 7, wherein the video signals and the GPS signals are received via a log periodic antenna.

10. A television reception system, comprising:
    a video signal receiver adapted to receive a terrestrially broadcast video signal;
    a global positioning system (GPS) receiver adapted to receive GPS signals from at least one satellite; and
    an antenna feed adapted to receive from a single antenna both the terrestrially broadcast video signal and the GPS signals, to provide the terrestrially broadcast video signal to the video signal receiver, and to provide the GPS signals to the GPS receiver.

11. The television reception system of claim 10, wherein the GPS receiver is adapted to receive the GPS signals, via the antenna feed, from a log-periodic antenna.

12. The television reception system of claim 10, further comprising:
    a GPS signal processor adapted to identify a location of the television reception system based on the received GPS signals; and a TV signal processor adapted to decode the received terrestrially broadcast video signal.

13. The television reception system of claim 12, further comprising:

means for storing a location code for the television reception system; and video signal decoding prevention means for preventing the received video signal from being decoded by the TV signal processor when the location detected by the GPS receiver does not match the location code.

14. The television reception system of claim 10, further comprising a single microprocessor adapted both to identify a location of the television reception system based on the received GPS signals, and to decode the received terrestrially broadcast video signal.

15. The television reception system of claim 14, further comprising:

means for storing a location code for the television reception system; and video signal decoding prevention means for preventing the received video signal from being decoded by the microprocessor when the location detected by the micro-processor does not match the location code.

16. A method of receiving television signals, comprising:

receiving, via a single antenna, a video signal broadcast from a terrestrial broadcast antenna, and a global positioning system (GPS) signal transmitted from at least one satellite;

providing the GPS signal to a GPS receiver; and providing the video signal to a video signal receiver.

17. The method of claim 16, wherein the antenna is a log-periodic antenna.

18. The method of claim 16, further comprising identifying a location of an apparatus executing the method of receiving television signals, based on the received GPS signals.

19. The method of claim 18, further comprising:

accessing a location code stored in a memory device; and decoding the video signal when the a location of the apparatus executing the method of receiving television signals matches the location code.

* * * * *